United States Patent [19]

Kawamura et al.

[11] 4,455,726
[45] Jun. 26, 1984

[54] CHAMFERING APPARATUS FOR END FACES OF TUBULAR MEMBERS

[75] Inventors: Teruaki Kawamura; Yukihiko Komatsu; Hiroshi Yamane, all of Shimonoseki, Japan

[73] Assignee: Kabushiki Kaisha Kobe Seiko Sho, Kobe, Japan

[21] Appl. No.: 302,118

[22] Filed: Sep. 14, 1981

[30] Foreign Application Priority Data

Oct. 31, 1980 [JP] Japan .................. 55-154510

[51] Int. Cl.³ .......................................... B23P 23/04
[52] U.S. Cl. .................................... 29/33 T; 144/205; 408/69; 408/130; 408/211
[58] Field of Search ........................ 408/44, 45, 50, 51, 408/52, 53, 68, 69, 70, 107, 118, 129, 224, 211, 130, 59, 57; 144/205; 29/33 T

[56] References Cited

U.S. PATENT DOCUMENTS

| | | | |
|---|---|---|---|
| 60,169 | 12/1866 | Gardiner | 408/118 |
| 1,285,584 | 11/1918 | Baines et al. | 408/53 |
| 2,242,487 | 5/1941 | Swanson | 408/41 |
| 2,427,816 | 9/1947 | Smith | 408/224 |
| 2,661,662 | 12/1953 | Hall | 408/107 |
| 2,724,201 | 11/1955 | Cavalero | 269/221 |
| 3,028,159 | 4/1962 | Hohwart | 269/221 |
| 3,085,453 | 4/1963 | Mossberg | 408/59 |
| 3,103,140 | 9/1963 | Connelly | 144/205 |
| 3,228,268 | 1/1966 | Strout | 408/211 |
| 3,313,186 | 4/1967 | Rochon | 408/59 |
| 3,693,683 | 9/1972 | Hurn | 408/70 |
| 3,817,648 | 6/1974 | Miller | 408/59 |
| 4,339,857 | 7/1982 | Dickinson | 29/33 T |

Primary Examiner—E. R. Kazenske
Assistant Examiner—H. Phan
Attorney, Agent, or Firm—Oblon, Fisher, Spivak, McClelland & Maier

[57] ABSTRACT

A chamfering apparatus for opposing end faces of a tubular member. The apparatus includes an abutment member capable of advancing toward or being retracted from a line of extension of the longitudinal axis of the tubular material so as to collide with the end face when advanced, a conveyor for transporting the tubular member toward the abutment member, a chuck provided between the abutment member and conveyor for releasably holding the tubular member on the conveyor, and a cutting tool displaceable relative to the end face of the tubular member received by the abutment member and held by the chuck. The cutting tool is capable of rotating around the longitudinal axis of the tubular member. The cutting tool is equipped with a cutting member adapted to taper cut the outer peripheral edge of the end face as well as a drill having a first cutting edge adapted to taper cut the inner peripheral edge of the end face and a second cutting edge adapted to cut the end face perpendicularly to the longitudinal axis of the tubular member. The chamfering apparatus can be applied to tubular members of different lengths as the end face of each tubular member can be positioned precisely owing to the provision of the abutment member and conveyor and only two cutting tools are required to chamfer three locations on each end face of the tubular member.

8 Claims, 10 Drawing Figures

CHAMFERING APPARATUS FOR END FACES OF TUBULAR MEMBERS

BACKGROUND OF THE INVENTION

1. Field of the Invention

This invention relates to a chamfering apparatus for an end face of a tubular member, and more particularly, to an apparatus for chamfering end faces of tubular members made of metals such as zirconium and zirconium alloys and including stainless steel, etc.

2. Description of the Prior Art

There have been known facilities to obtain tubular products with mirror-finished outer and inner surfaces through cutting work for cutting rolled tubular members into predetermined lengths, and subsequent treatment steps such as annealing, cutting and pickling treatments. Since the cutting work produces so-called burrs at each end face of a tubular member, a chamfering machine has been employed as one of such facilities for chamfering each end face of a tubular member after cutting the same into a predetermined length with a view toward removing the burrs.

The aforementioned chamfering work must be performed on three faces or, in other words, includes taper cutting the outer peripheral edge of the end face of the tubular member, taper cutting the inner peripheral edge of the same end face and cutting the end face in a direction perpendicular to the axis of the tubular member. Thus, special cutting tools designed exclusively for their respective faces have been conventionally used, thereby unavoidably resulting in rendering the chamfering machine complex in structure. Moreover, such a chamfering machine is susceptible to causing improper adjustment among its cutting tools and, consequently, no precise, smooth and fast chamfering work of end faces was expected on the aforementioned conventional chamfering machine.

SUMMARY OF THE INVENTION

With the foregoing in view, the present invention allows the chamfering work to be performed by only two tools although three faces are to be machined. In addition, it is possible to precisely set the relative position between the tools and a tubular member resulting in fast, efficient and precise chamfering work. This invention thus provides a chamfering apparatus for an end face of a tubular member including an abutment member capable of advancing toward or retreating from line of extension the longitudinal axis of the tubular member so as to collide with the end face of the tubular member when advanced, a conveyor for transporting the tubular member toward the abutment member and thrusting the former against the latter, a chuck provided between the abutment member and conveyor for releasably holding the tubular member on the conveyor, and a cutting tool displaceable relative to the end face of the tubular member received by the abutment member and held by said chuck and capable of rotating around the longitudinal axis of said tubular member, the cutting tool being equipped with a cutting member adapted to taper cut the outer peripneral edge of the end face as well as a drill having a first cutting edge adapted to taper cut the inner peripheral edge of the end face and a second cutting edge adapted to cut the end face perpendicularly to the longitudinal axis of said tubular member.

BRIEF DESCRIPTION OF THE INVENTION

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFFERED EMBODIMENT

Figure 1:
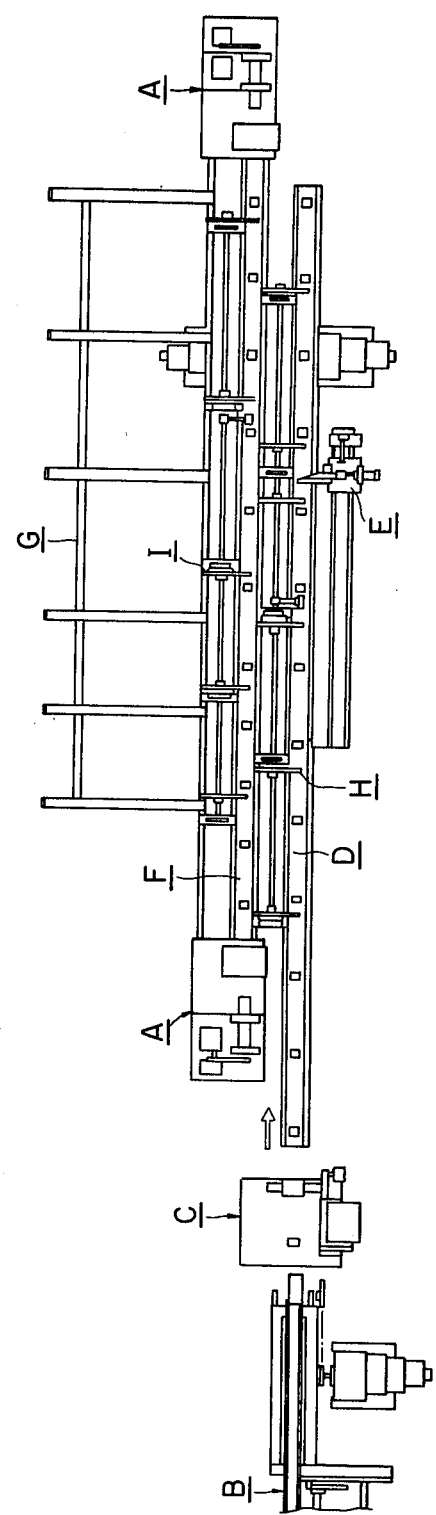
FIG. 1 is a diagrammatic plan view of cutting and chamfering facilities for tubular materials, incorporating a chamfering apparatus embodying the present invention.

Referring first to FIG. 1 illustrating in plan the outline of entire facilities incorporating a chamfering apparatus A according to this invention, a transportation belt conveyor for an inspection table is generally indicated by letter B while a cutting machine and a table therefor are represented respectively by letters C and D. A length adjuster, chamfering table and table for chamfered tubular materials are indicated by letters E, F and G, respectively. The roller-type table D for the cutting machine C is installed in the transportation direction of the above-described transportation belt conveyor B, on the transportation axis thereof and on the same horizontal plane as the transportation belt conveyor B. The cutting machine C is disposed at the feeding-out end of the transportation belt conveyor B.

The cutting machine C is of the so-called circular saw type. A tubular member, which has been conveyed onto the cutting machine table D, is stopped by the length adjuster E and then cut into a predetermined length. The length adjuster E can be shifted and fixed along the length of the cutting machine table D.

The cutting machine table D, chamfering table F and table G for chamfered tubular materials are arranged parallel to one another. Ejectors H, I are provided between the cutting machine table D and chamfering table F and between the chamfering table F and table G respectively, to thereby pass a tubular member on the cutting machine table D, which has been cut into the predetermined length, onto the chamfering table F and, after both end faces of the tubular member have been subjected to chamfering work by means of the chamfering apparatus A, A provided at both ends of the chamfering table F, to eject the thus-chamfered member onto the table G.

It is desirable to impart a stopper function to the ejectors I so as to exactly position the tubular member on the chamfering table F, more specifically, on inwardly bevelled rollers of the chamfering table F when the tubular member is passed onto the chamfering table F by means of the ejectors H, although the drawing does not show any mechanism to provide such a stopper function with the ejectors I.

Referring now to FIG. 2 through FIG. 10, the chamfering apparatus A according to this invention will be described in detail. Both chamfering apparatus A, A shown in FIG. 1 are of an identical construction and the following description is made with respect to one of the chamfering apparatus A, A only.

In FIG. 2 through FIG. 5, the chamfering table F is constructed by frames 1, 1 and a conveyor 4 which in turn is formed of a conveyor frame 2 extending between the frames 1, 1 and a plurality of rollers 3 having a bevelled portion 3A and arranged on the frame 2 in a row along the length of the frame 2 with a predetermined interval. The rollers 3 may be reversibly driven by transmitting the driving force of an unillustrated motor or the like through, for example, a wrapping connector driving device.

A tubular member 5 cut into a predetermined length is supported by the bevelled portions of the rollers and is prepared for transportation along the longitudinal axis of the member 5. On an extension of the longitudinal axis of the tubular member 5 loaded on the conveyor 4 is provided an abutment member 6 adapted to be brought into contact with the proximal end face of the tubular member 5. Abutment member 6 is displaceable between two positions so as to be advanced toward the extension of the longitudinal axis of the tubular member 5 or be retracted from the extension.

In the illustrated embodiment, a base plate 8 is fixedly secured on the support frame 1 via a bracket 7. On the base plate 8 are uprightly provided four posts 9, which are arranged diagonally in plan, on which a cylinder installation base is attached. A telescopic hydraulic cylinder 11 is disposed in an upright position on a cylinder installation base 10 and the abutment member 6 is detachably connected to the piston rod end of the cylinder 11.

A stopper 12 is provided on the base plate 8 at a location confronting the abutment member 6 to limit the downward movement of the member 6. The abutment member 6 has an arm 13, an end cylinder 13A of which arm 13 is slidably fitted on one of the posts 9.

Thus, expansion of the hydraulic cylinder 11 causes the abutment member 6 to assume a position on the extension of the longitudinal axis of the tubular member 5 while contraction of the cylinder 11 allows the abutment member 6 to upwardly retract from the extension of the longitudinal axis of the tubular member 5. During this advancement and retracting position change, the post 9 produces a guide function in cooperation with the end cylinder 13A.

A chuck 14 is provided between the abutment member 6 for the end face of the tubular member 5 and conveyor 4 for releasably holding the member 5. In the illustrated embodiment, the chuck 14 is a split chuck and one of the half chucks, i.e., the lower half chuck 14A is fixed on the base plate 8 while the other half chuck, i.e., the upper half chuck 14B is detachably connected to the piston rod end of a telescopic hydraulic cylinder 15 mounted in upright position on the cylinder installation base 10.

When the half chucks 14A, 14B are brought into engagement (in other words, the upper half chuck 14B is lowered due to an expansion of the cylinder 15), the chuck 14 holds the tubular member 5. Similarly, when the cylinder 15 is contracted, the tubular member 5 is released from the chuck 14. Split half sleeves 16A, 16B are provided, respectively, on the facing surfaces of the half chucks 14A, 14B to ensure holding of the tubular member 5.

To render the advancement and retracting movement of the upper half chuck 14B accurate, a cylindrical portion 17A provided at the free end of an arm 17 of the half chuck 14B is slidably fitted on a post 9. The advanced position of the abutment member 6 for the end face of the tubular member 5 and the holding position of the chuck 14 are both on the longitudinal axis of the tubular member 5.

Figure 2:
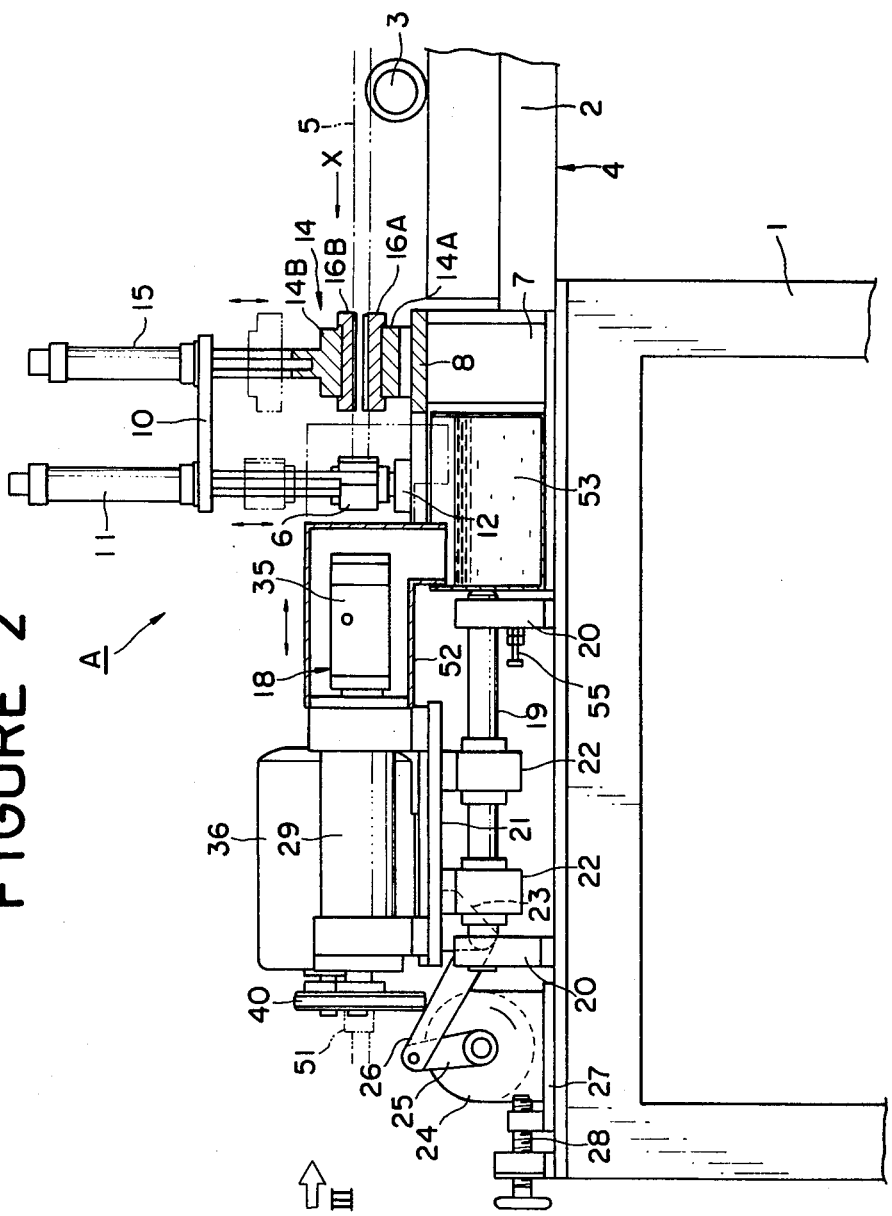
FIG. 2 is a partially cut away side view of the chamfering apparatus.
Figure 3:
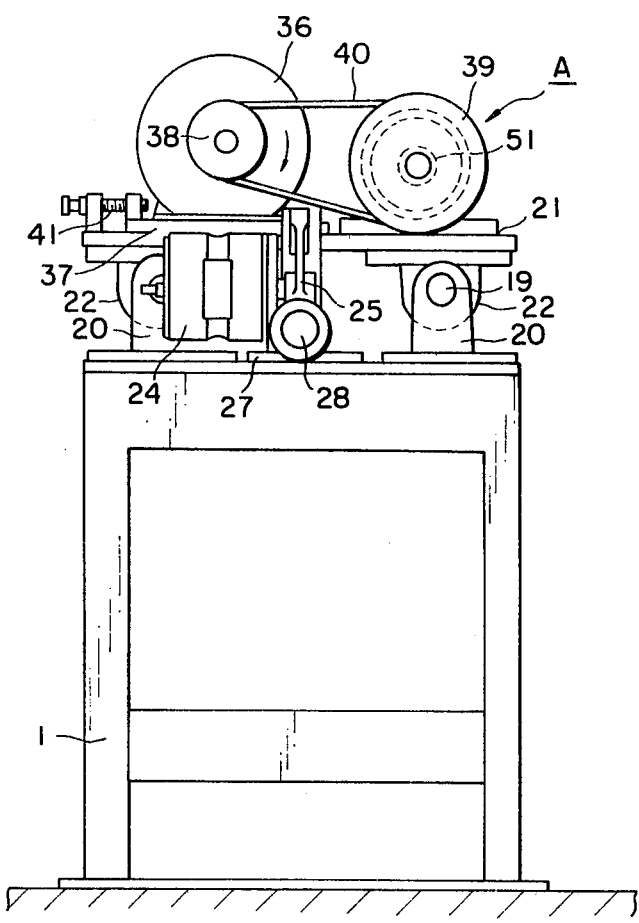
FIG. 3 is a rear elevational view of the chamfering apparatus, seen in the direction indicated by Roman Numeral III in FIG. 2.
Figure 4:
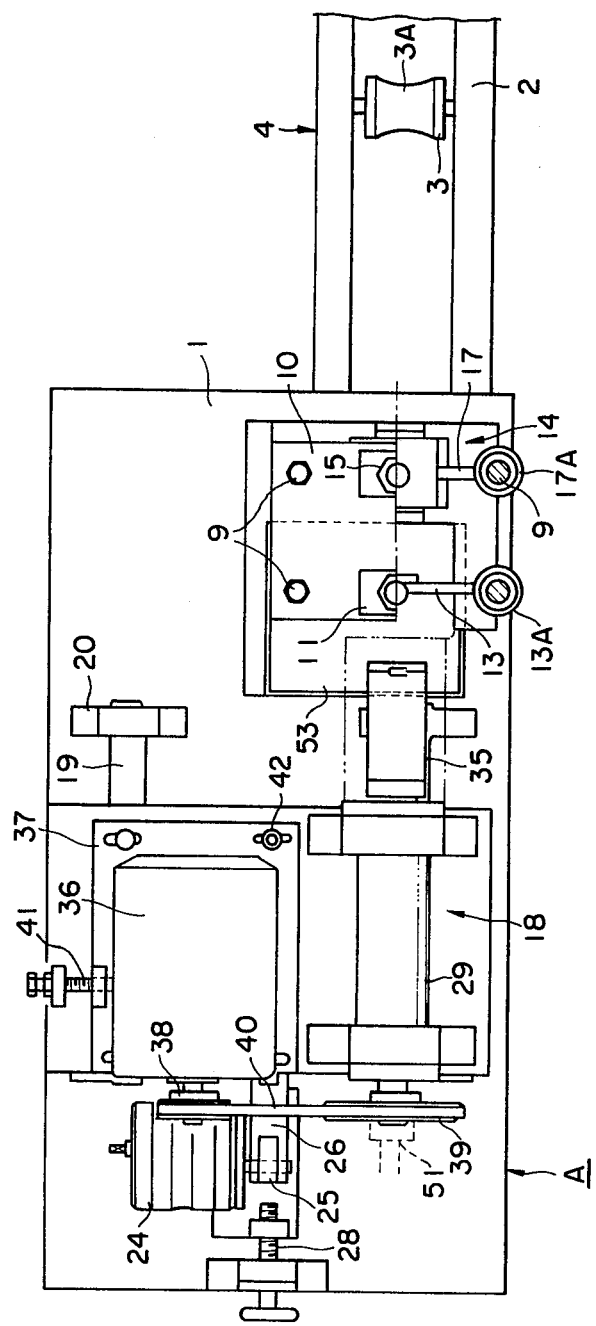
FIG. 4 is a plan view of the chamfering apparatus.

Thus, by driving the conveyor 4 in the direction indicated in FIG. 2 while keeping the upper half chuck 14B of the chuck 14 in a raised position and the abutment member 6 in a lowered position on the line of extension of the longitudinal axis of the tubular member 5, the end face of the tubular member 5 on the conveyor 4 is thrust against the abutment member 6 and stopped by the member 6. Then, the half chuck 14B is lowered to grasp the tubular member 5 and, thereafter, the abutment member 6 is retracted upwardly, thereby completing preparatory work for the chamfering work of the end face.

In the illustrated embodiment, there is provided on the support frame 1 in front of the conveyor 4a cutting tool 18 which moves back and forth relative to the proximal end face of the tubular member 5 held by the aforementioned chuck 14 and rotates about the longitudinal axis of the tubular member 5. A pair of shafts 19 are provided on the support frame 1 in parallel with the longitudinal axis of the tubular member 5 by means of bearings 20, and a tool-mounting base 21 is slidably mounted on the shafts 19 through cylindrical sliders 22. By cooperatively coupling a bracket 23 provided on the lower surface of the tool-mounting base 21 to a crank arm 26 and the crank arm 26 to a crank arm 25 attached to a motor 24, the tool-mounting base 21 is reciprocally displaceable owing to the cranking movement driven by the motor 24 while being guided by the shafts 19. Here, the motor 24 is reciprocating the cutting tool 18 back and forth relative to the proximal end face of the tubular material 5 is slidably fixed on the support frame 1, as a motor-mounting base 27 is provided on the support frame 1 through a guide member (not shown) (a combination of a long slit and a bolt). The motor-mounting base 27 can be fixed on the support frame 1 by a threaded coupler 28.

On the tool-mounting base 21 along the extension of the longitudinal axis of the tubular member 5 there is provided a tool-supporting cylinder 29 in which a tool-driving shaft 30 is supported for rotation relative to the cylinder 29 by a bearing 31. A bearing retainer 32 is detachably secured on the end face of the supporting cylinder 29 by means of a screw 33. A tool head 35 is threadedly fastened on the driving shaft 30 through an adaptor 34.

On the other hand, a driving motor 36 is mounted on the tool-mounting base 21 with a mounting base 37 interposed therebetween alongside the supporting cylinder 29. A belt 40 extends between a pulley 38 on the driving motor 36 and another pulley 39 on the tool-driving shaft 30, thereby allowing the tool head 35 to freely rotate around the longitudinal axis of the tubular member 5 by virtue of the driving of the motor 36 through the driving shaft 30. The tension of the belt 40 is adjustable by a threaded coupler 41 and slide guide 42 (see, FIG. 4).

Figure 5:
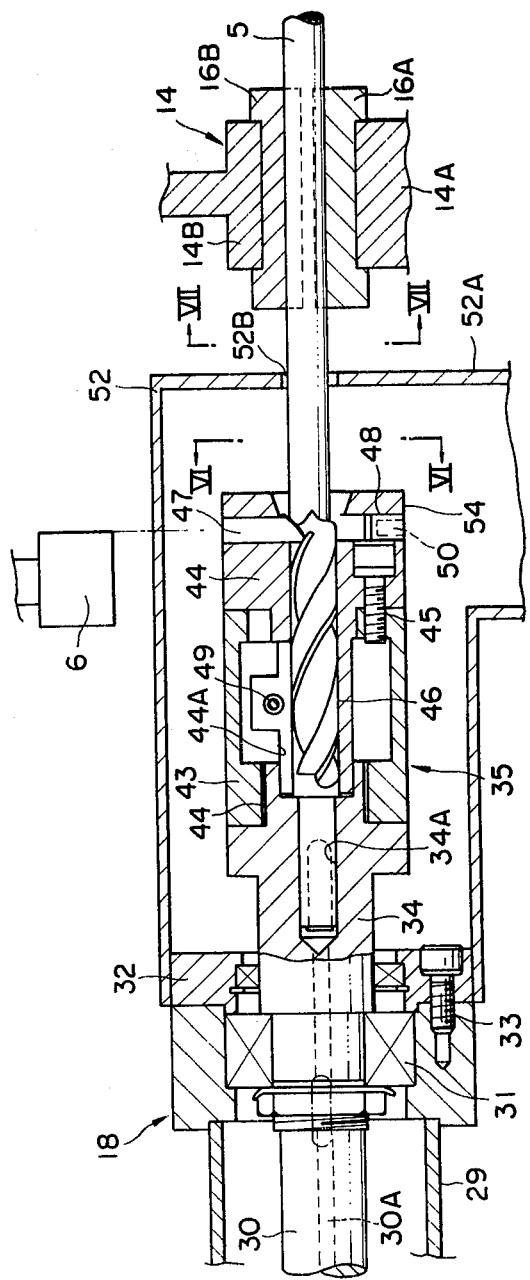
FIG. 5 is a cross-sectional side view showing the cutting head of the chamfering apparatus in detail.

The tool head 35 is constructed, as illustrated particularly in detail in FIG. 5, by threadedly connecting the adaptor 34 defining a bore 34A as a drill chuck along its longitudinal axis with a supporting cylinder 43 and attaching a tool holder 44 with the supporting cylinder 43 through a screw 45. A drill 46 is then inserted in a central bore of the tool holder 44, and a tool member 47 and its cradle 48 are disposed near the end face of the tool holder 44.

Figure 6:
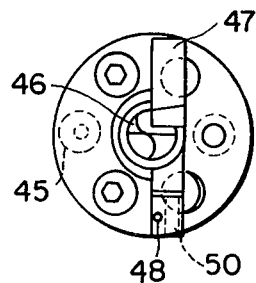
FIG. 6 is a cross-sectional view taken along the line VI—VI of FIG. 5.
Figure 7:
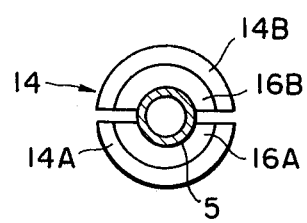
FIG. 7 is a cross-sectional view taken along the line VII—VII of FIG. 5.
Figure 8:
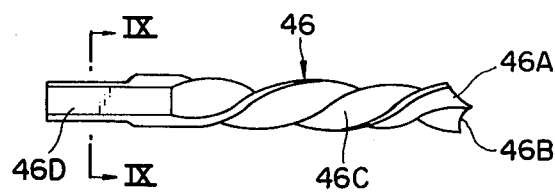
FIG. 8 is a side view of a drill.
Figure 9:
FIG. 9 is a cross-sectional view taken along the line IX—IX of FIG. 8.
Figure 10:
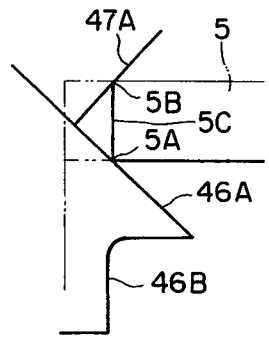
FIG. 10 is a schematic illustration showing an end face of a tubular material under cutting work by the drill and a cutting member.

In the present embodiment, the drill 46 has at the tip portion of the drill portion 46C thereof an oblique cutting edge 46A for taper cutting the peripheral inner edge of the end face as well as a straight cutting edge 46B formed continually with the oblique cutting edge 46A and adapted to cut the end face at a right angle with respect to the longitudinal axis of the tubular member 5, as depicted in FIGS. 8 and 10. The drill shank 46 of the drill is flattened to form a tongue which is to be inserted in the chuck hole 34A of the adaptor 34. By tightening up a key 44A disposed in a longitudinal slit formed in the cylindrical portion of the tool holder 44, the drill portion 46C can be rotated together with the tool holder 44. On the other hand, the cutting member 47 is, as shown in FIG. 6, shifted transversely from the longitudinal axis of the drill 46 and a cutting edge 47A for cutting the outer peripheral edge of the end face is formed at the free end of the cutting member 47 (see FIG. 10). The free end of the cutting member 47 abuts against the cradle 48 which is radially adjustable by means of an adjustment bolt 50. The drill 46 is a commercially available drill which has a rather lengthy shaft portion. This drill is used because the cutting edge can be reground for repetitive uses. The spirally formed grooves of the drill are used to feed coolant to the tip and to blow air to remove cutting chips.

Although the drill 46 and cutting member 47 constitute the cutting tool 18 as described above, the longitudinal axis of the drill 46 lies on the extension of the longitudinal axis of the tubular member 5 in the embodiment illustrated herein, and the oblique cutting edge 46A of the drill 46 extends continually from the straight cutting edge 46B thereof and the cutting edge 47A of the cutting member 47 is disposed at a right angle with respect to the oblique cutting edge 46A (see, FIG. 10).

As depicted in FIG. 5, a conduit 30A for liquid coolant is bored through the tool-driving shaft 30 in communication with the chuck bore 34A of the adaptor 34. The liquid coolant is fed through a rotary joint 51 (see, FIGS. 2 to 4) provided at the front end of the driving shaft 30. The cooling liquid is allowed to travel through a spiral groove of the drill portion 46C to the cutting edges 46A, 46B, 47A, thereby preventing cut-off chips from burning due to frictional heat developed by the cutting and positively washing away the cut-off chips.

A cover 52 is attached to the bearing retainer 32, embracing the tool head 35. Cover 52 is formed into a downwardly extending guide portion 52A below an area where cutting work takes place. Used liquid coolant is thus received together with cut-off chips in a receptacle 53 placed on the support frame 1. Cover 52 defines a hole 52B for permitting free passage of the tubular material 5 therethrough so that the provision of the cover 52 does not hamper the cutting work. Receptacle 53 is upwardly open in view of the stroke of the back and forth displacement of the cutting tool 18 as the cover 52 follows the movement of the cutting tool 18. Abutment member 6 can be raised by the cylinder 11 to avoid any interference with the cover 52. In FIG. 5, reference numeral 54 indicates a tool holder provided to hold the cutting member 47.

The operation of the chamfering apparatus of this invention is apparent from the above description. However, to further clarify its understanding, an outline of chamfering work on an end face of a tubular member will be described hereinbelow.

When a tubular member 5, which has been cut into a predetermined length, is transported onto the chamfering table F and mounted on the rollers 3 thereof, the abutment member 6 is brought into a waiting position on an extension of the longitudinal axis of the tubular member 5 through expansion of the cylinder 11. At the same time, the upper half chuck 14B of the chuck 14 is kept in the raised position through contraction of the cylinder 15. Then, upon driving the rollers 3 in the X direction as indicated in FIG. 2, the tubular member 5 on the conveyor 4 is thrust against and stopped by the abutment member 6.

Thereafter, the upper half chuck 14B is lowered through expansion of the cylinder 15 and holds the tubular member 5 while the abutment member 6 is raised up to the upper waiting position through contraction of the cylinder 11. Then, actuation of the reciprocating motor 24 and driving motor 36 causes the cutting tool 18 to move rapidly back and forth using the shafts 19 as its guides with a temporary stop at a point intermediate between the back and forth movements, thereby causing the cutting tool 18 to reciprocate with a desired stroke, transmitting the rotary torque of the motor 36 to the driving shaft 30 through the belt 40 and rotating the cutting member 47 and drill 46 in the cutting direction through the forced revolution of the tool head 35. The above rapid back and forth movement on the shaft 19 is typical of the crank movement. It is desirable to provide a threaded stopper 55 so that the reciprocating stroke can be suitably adjusted (see, FIG. 2).

Thus, the tubular member 5 held by the chuck 14 has been inserted through the hole 52B formed in the cover 52 as shown in FIG. 5. By causing the drill 46 and cutting member 47 to approach the proximal end face of the tubular member 5 and to contact with the end face, the inner peripheral edge 5A and end face 5C of the tubular member 5 are cut respectively by the oblique cutting edge 46A and straight cutting edge 46B of the drill 46, while the outer peripheral edge 5B of the tubular member 5 is cut by the oblique cutting edge 47A of the cutting member 47. During the above cutting work, cut-off chips can be prevented from burning due to frictional heat by introducing liquid coolant to the cutting edges through the rotary joint 51 and the cut-off chips can be received together with used coolant in the receptacle 53. Any scattering of the liquid coolant and cut-off chips is avoided by the provision of the cover 52.

Upon completion of such cutting work, the cutting tool 18 is retracted and the gripping force of chuck 14 is released At the same time, the rollers 3 are driven in the opposite direction so as to feed the tubular member 5 in a direction opposite to that indicated by letter X in FIG. 2 for cutting the other end face of the tubular member 5. The abutment member 6 of the other chamfering apparatus A has already been advanced to a waiting position on the extension of the longitudinal axis of the tubular member 5.

Since the chamfering apparatus according to this invention is constructed as described above, it has the following advantages:

As the tubular member 5 is forced against the abutment member 6 at an end face thereof and is then held by the chuck 14, the position of the end face can be set correctly depending on the relative position between the cutting tool 18 and abutment member 6, thereby permitting chamfering work to be performed on tubular members of different lengths.

The end face of a tubular member can be rapidly and precisely chamfered by displacing the cutting tool 18 back and forth relative to the end face of the tubular member 5 held by the chuck 14 and rotating the cutting tool 18. Although the end face contains three places to be machined, the chamfering work of the end face can be performed by two cutting tools only, i.e., the cutting member 47 and drill 46, thereby facilitating maintenance of the cutting member 47 and drill 46 and allowing precise chamfering work.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. Apparatus for simultaneously taper cutting the outer peripheral edge of the end face of a tubular member, taper cutting the inner peripheral edge of the same end face, and cutting the end face in a direction perpendicular to the axis of the tubular member, said apparatus comprising:
   (a) an abutment member (6);
   (b) first means comprising a telescopic hydraulic cylinder (11) for advancing said abutment member (6) into and retracting it away from a line of extension of the longitudinal axis of the tubular member (5) so as to prevent further axial movement of the tubular member (5) when said abutment member (6) is advanced;
   (c) a conveyor (4) for transporting the tubular member (5) toward the abutment member (6) and thrusting the tubular member (5) against the abutment member (6);
   (d) a chuck (14) provided between said abutment member (6) and said conveyor (4) for releasably holding the tubular member (5) in an axial position precisely defined by contact of the tubular member (5) against said abutment member (6);
   (e) a cutting tool (18) which is rotatable about and axially reciprocable along the longitudinal axis of the tubular member (5), the tip portion of said cutting tool (18) having an oblique cutting edge (46A) for taper cutting the inner peripheral edge of the end face of the tubular member (5), a straight cutting edge (46B) for cutting the segment of the end face of the tubular member (5) which is immediately adjacent to and radially outward of the inner peripheral edge of the end face of the tubular member (5) at a right angle to the longitudinal axis of the tubular member (5), and an oblique cutting edge (47A) for taper cutting the outer peripheral edge of the end face of the tubular member (5) radially outwardly of and immediately adjacent to the segment of the end face of the tubular member (5) cut by said straight cutting edge (46B);
   (f) second means (36, 38, 39) for rotating said cutting tool (18) around the longitudinal axis of the tubular member (5);
   (g) third means (24, 25, 26) for axially reciprocating said cutting tool (18) along the longitudinal axis of the tubular member (5) towards and away from said axial position precisely defined by contact of the tubular member (5) against said abutment member (6);
   (h) a linear guide (9) the axis of which is parallel to the axis of said telescopic hydraulic cylinder (11); and
   (i) fourth means (13, 13A) operatively connecting said telescopic hydraulic cylinder (11) to said linear guide (9) for slidably guiding the extension of said telescopic hydraulic cylinder (11).

2. Apparatus as recited in claim 1 wherein said cutting tool (18) comprises:
   (a) a drill (46) the tip portion of which is formed into said oblique cutting edge (46) and, continuously therewith, said straight cutting edge (46B) and
   (b) a separate cutting member (47) the tip portion of which is formed into said oblique cutting edge (47A).

3. Apparatus as recited in claim 2 wherein:
   (a) said cutting tool (18) further comprises a tool holder (44);
   (b) said drill (46) is disposed in said tool holder (44) along the longitudinal axis of said tool holder (44); and
   (c) said cutting edges (46A, 46B, and 47A) are positioned adjacent a free end face of said tool holder (44).

4. Apparatus as recited in claim 3 and further comprising:
   (a) a tool-driving shaft (30) which is coaxial to said tool holder (44) and which is operatively connected to said tool holder (44) such that rotation of said tool-driving shaft (30) is transmitted to said tool holder (44) and
   (b) a conduit (30A) for liquid coolant for said cutting edges (46A, 46B, 47A) located in said tool-driving shaft (30).

5. Apparatus as recited in claim 11 wherein said oblique cutting edge (46A) for taper cutting the inner peripheral edge of the end face of the tubular member (5) and said oblique cutting edge (47A) for taper cutting the outer peripheral edge of the end face of the tubular member (5) are perpendicular to one another.

6. Apparatus as recited in claim 1 wherein said chuck (14) comprises:
   (a) a telescopic hydraulic cylinder (15);
   (b) a first half chuck (14B) operatively connected to said telescopic hydraulic cylinder (15); and
   (c) a second half chuck (14A) which is fixed relative to said telescopic hydraulic cylinder (15).

7. Apparatus as recited in claim 1 wherein said third means (24, 25, 26) comprises:
   (a) a motor (24);
   (b) a first crank arm (25) coupled to said motor (24); and
   (c) a second crank arm (26) coupled to said first crank arm (25) and to said second means (36, 38, 39) for rotating said cutting tool (18) around the longitudinal axis of the tubular member (5).

8. Apparatus as recited in claim 1 wherein said conveyer (4) comprises a plurality of inwardly bevelled rollers (3, 3A) disposed along the length of said conveyer (4) at predetermined intervals.

* * * * *